Oct. 12, 1943.  E. L. ALLEN ET AL  2,331,286
CROSS BAR STRUCTURE FOR ENDLESS TRACKS
Filed Jan. 28, 1942  6 Sheets-Sheet 1

INVENTORS:
EDWIN L. ALLEN
HAROLD B. MUSTER
BY Hyde and Meyer
ATTORNEYS.

Oct. 12, 1943.  E. L. ALLEN ET AL  2,331,286
CROSS BAR STRUCTURE FOR ENDLESS TRACKS
Filed Jan. 28, 1942  6 Sheets-Sheet 2
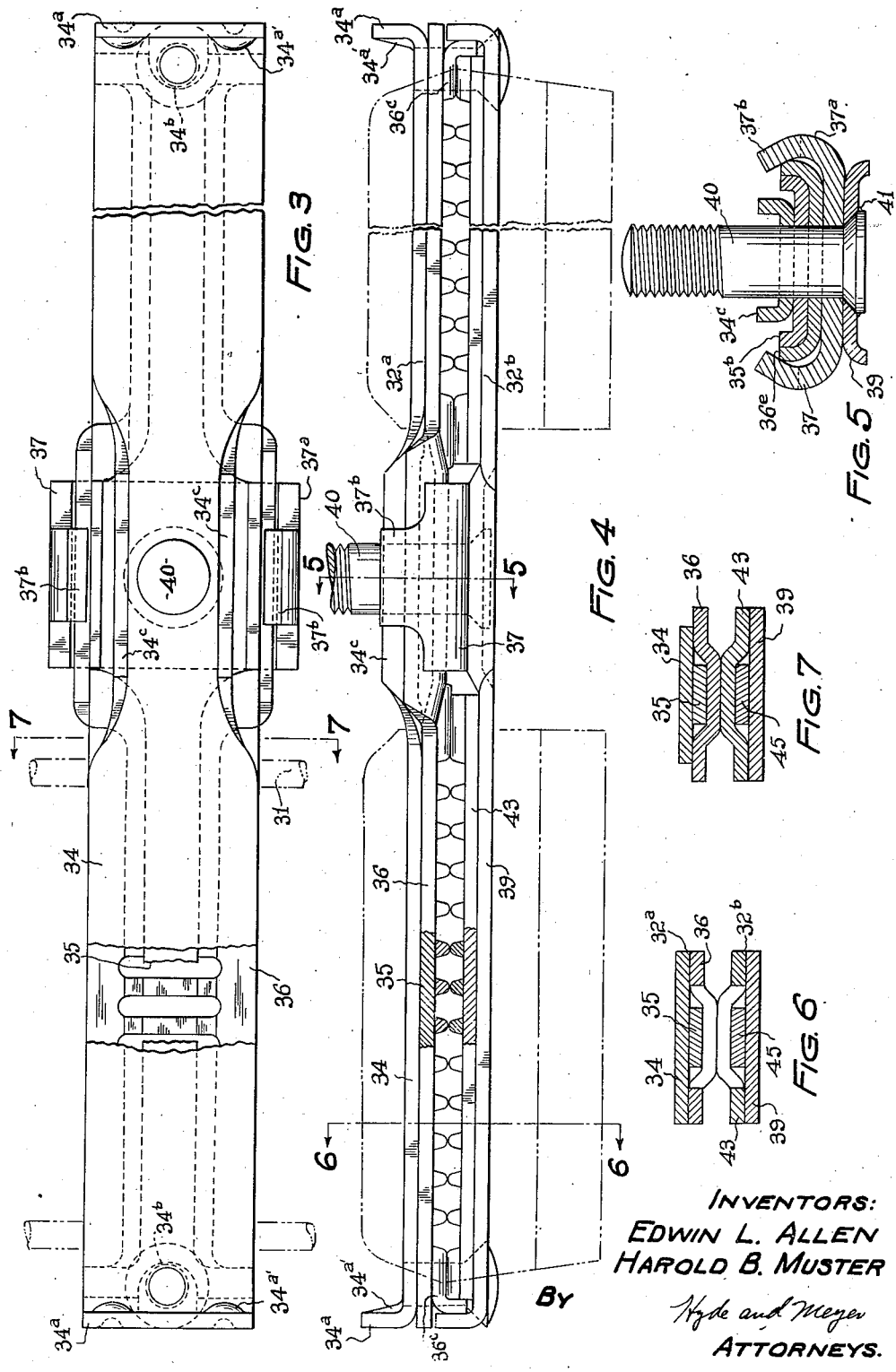
INVENTORS:
EDWIN L. ALLEN
HAROLD B. MUSTER
By Hyde and Meyer
ATTORNEYS.

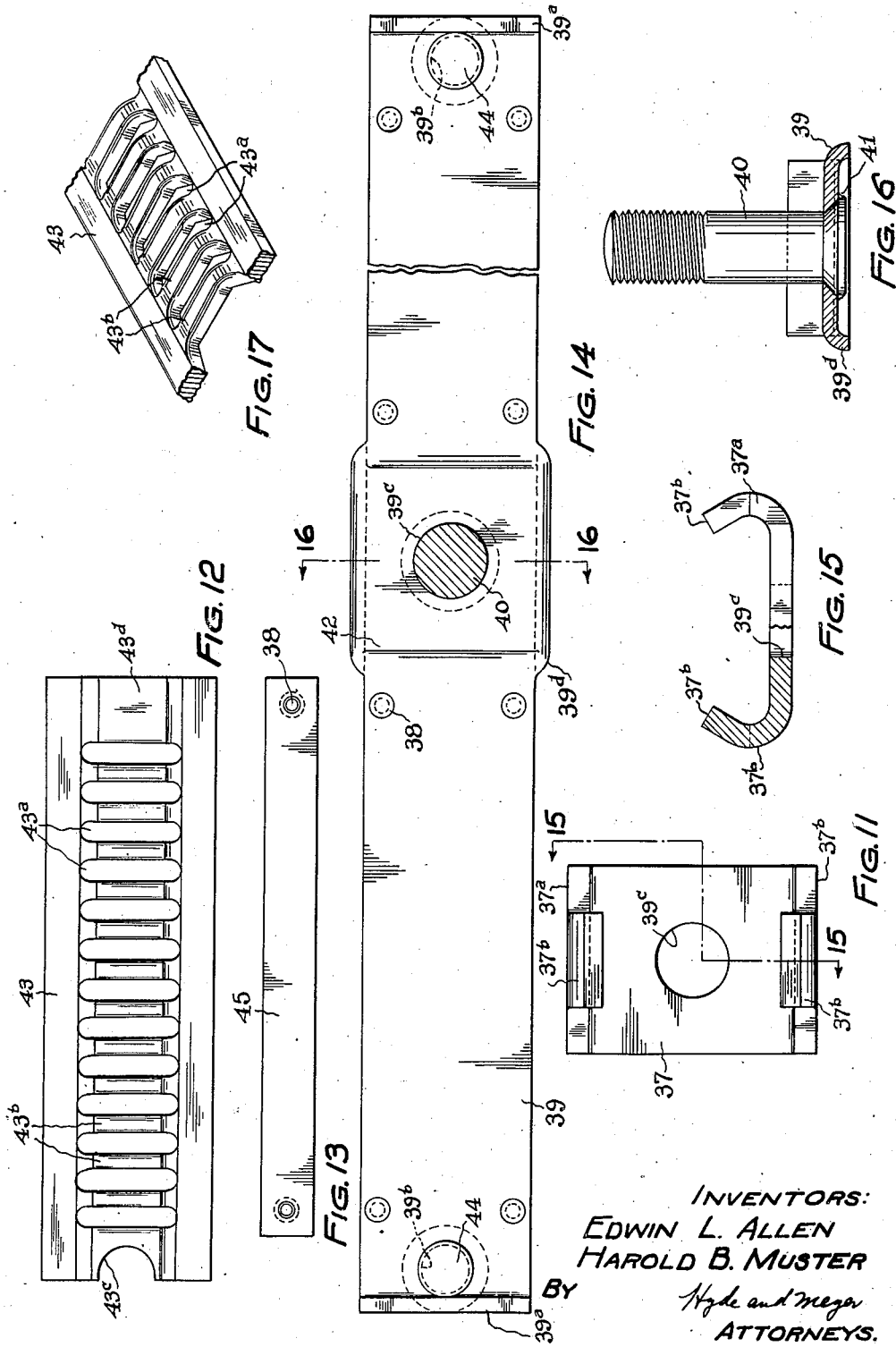

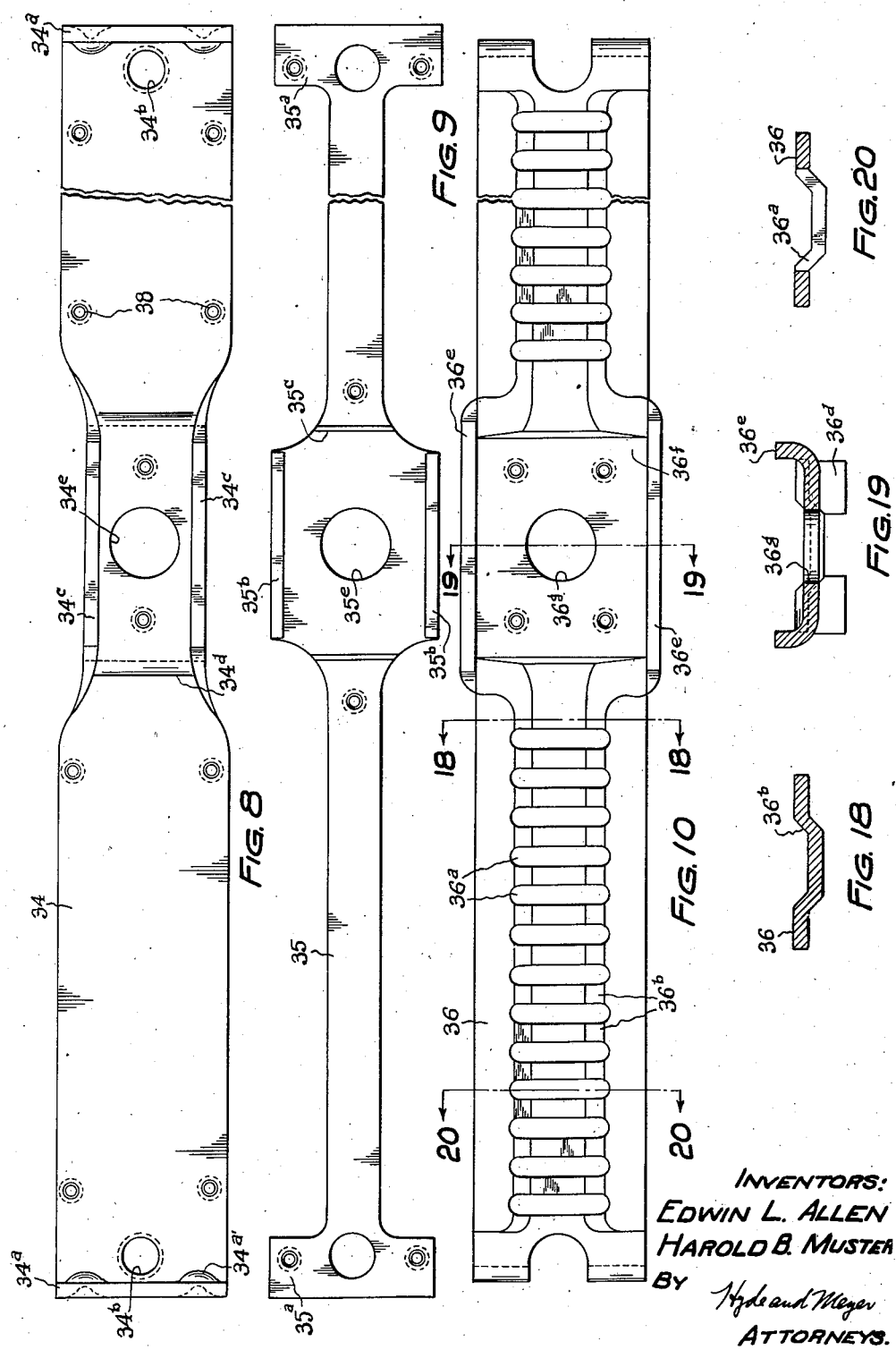

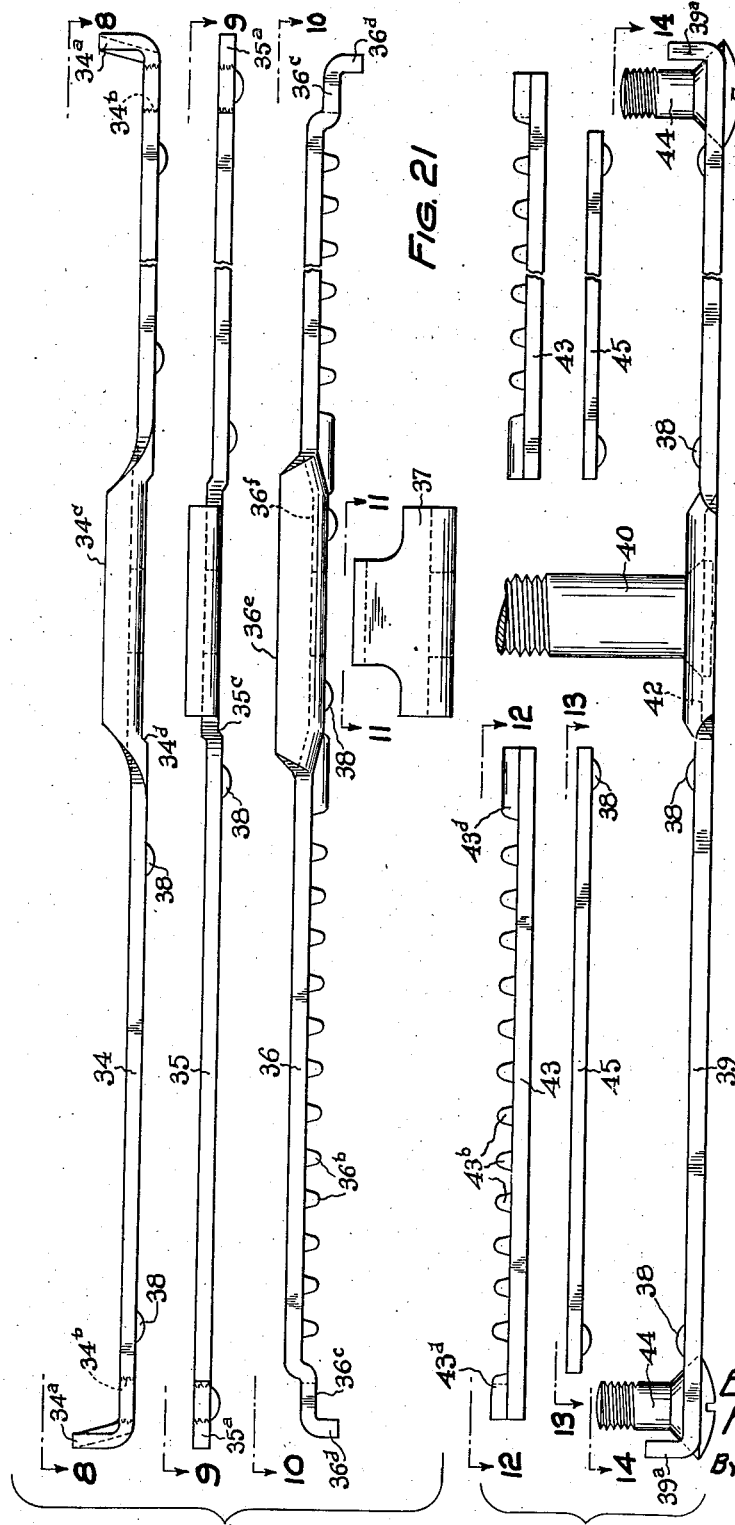

Oct. 12, 1943.    E. L. ALLEN ET AL    2,331,286
CROSS BAR STRUCTURE FOR ENDLESS TRACKS
Filed Jan. 28, 1942    6 Sheets-Sheet 6
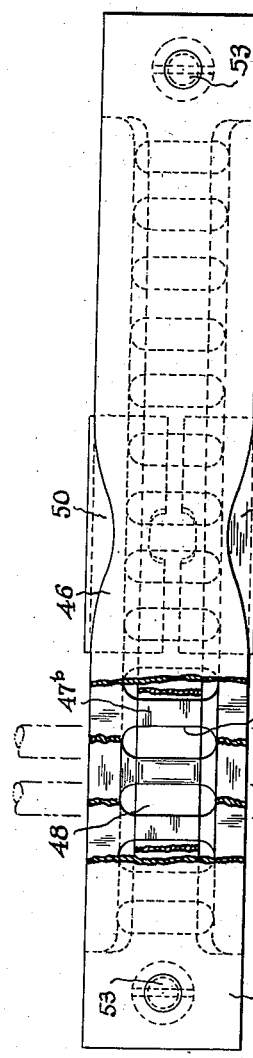
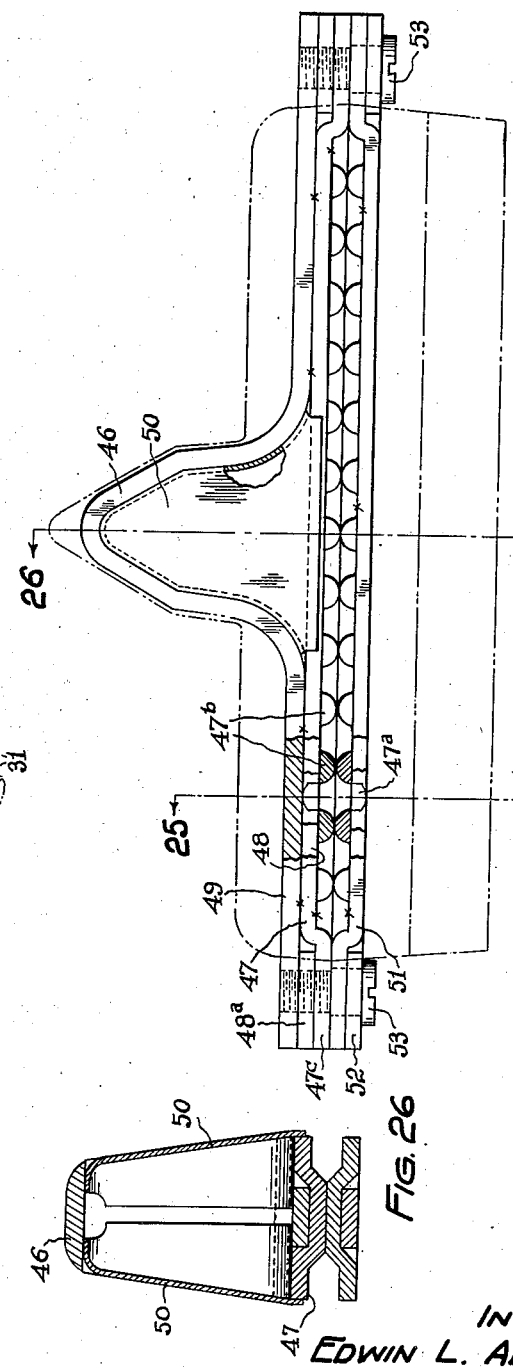
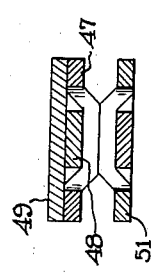
INVENTORS:
EDWIN L. ALLEN
HAROLD B. MUSTER
By Hyde and Meyer
ATTORNEYS

Patented Oct. 12, 1943

2,331,286

UNITED STATES PATENT OFFICE 2,331,286

CROSSBAR STRUCTURE FOR ENDLESS TRACKS

Edwin L. Allen and Harold B. Muster, Cleveland Heights, Ohio, assignors to Rudolph I. Schonitzer, Shaker Heights, Ohio Application January 28, 1942, Serial No. 428,522

10 Claims. (Cl. 305—10)

This invention relates to improvements in crossbar structures for flexible endless belt-like tracks for use on tractors, tanks and other vehicles of the self-laying track type.

An object of the present invention is to provide a crossbar structure made of metal plates which have been subjected to stamping, slotting, bending, welding and similar operations, to provide a crossbar structure which is suitable for mass production, which requires no machining, which has great uniformity as to size, which has hard wearing surfaces, and which is cheap to produce.

Among the specific objects of the present invention is to provide a crossbar structure wherein plate members have projections struck up from the metal of the plate adapted to lie between and to properly space parallel cables in the endless track.

Another object is to provide a crossbar structure built up of a plurality of plate members formed to provide the necessary strength with a minimum of weight and wherein a plurality of plates are welded together to reinforce each other.

Another object of the present invention is to provide a crossbar structure of the type described wherein the parts are of simple form, which are cheaply made and easily secured together.

Other objects and advantages of the present invention will be apparent from the accompanying drawings and description and the essential features will be set forth in the claims.

In the drawings, Fig. 1 is a fragmental side elevational view of a portion of a flexible endless track equipped with our invention.

Fig. 3 is a top plan view of one of the crossbars of Figs. 1 and 2 before the rubber covering is applied.

Fig. 4 is a side elevational view of the bar of Fig. 3 with the rubber track indicated in dot-dash lines and with a portion of the structure broken away in section to more clearly show the formation.

Figs. 5 and 6 are transverse sectional views taken along similarly numbered lines of Fig. 4.

Fig. 7 is a transverse sectional view taken along the line 7—7 of Fig. 3.

Figs. 8, 9 and 10 are top plan views of the three members forming the upper half or sub-assembly of Figs. 4, 6 and 7.

Fig. 11 is a top plan view of a driving plate connected with the upper sub-assembly, this view being taken in the position of line 11—11 of Fig. 21.

Figs. 12, 13 and 14 are top plan views of the parts making up the lower half or sub-assembly of Figs. 4 and 6.

Fig. 15 is a view taken along the line 15—15 of Fig. 11.

Fig. 16 is a sectional view taken along the line 16—16 of Fig. 14.

Fig. 17 is a fragmental perspective view of a portion of Fig. 12.

Figs. 18, 19 and 20 are transverse sectional views taken along similarly numbered lines of Fig. 10.

Fig. 21 is an exploded view of the upper sub-assembly of Figs. 4, 6 and 7.

Fig. 22 is an exploded view of the lower sub-assembly of Figs. 4, 6 and 7.

Figs. 23 to 26 are views of a modified form of device, Fig. 23 being a top plan view of the same with a portion broken away to more clearly show the structure, Fig. 24 being a side elevational view of the device of Fig. 23, and Figs. 25 and 26 are transverse sectional views taken along similarly numbered lines of Fig. 24.

Our improved crossbar structure is intended for the same type of use as the crossbars 12 and 12' shown in United States Patent No. 2,107,490 granted February 8, 1938 to Robert Mayne, although they are not necessarily restricted to exactly the type of track there described. In other words the track need not be formed of an endless rubber belt and the track is not necessarily composed of two parallel endless belts but may comprise a single width of belt as shown in the modified form herein disclosed in Figs. 23 to 26.

Figure 1:
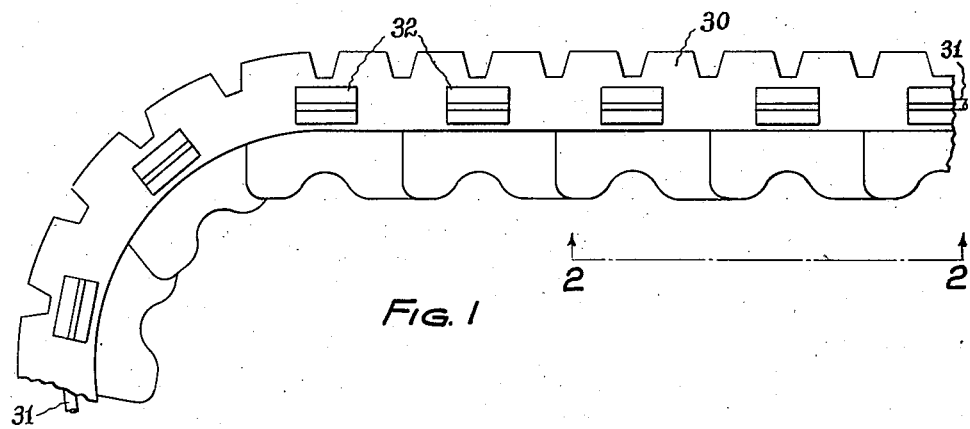
Figure 2:
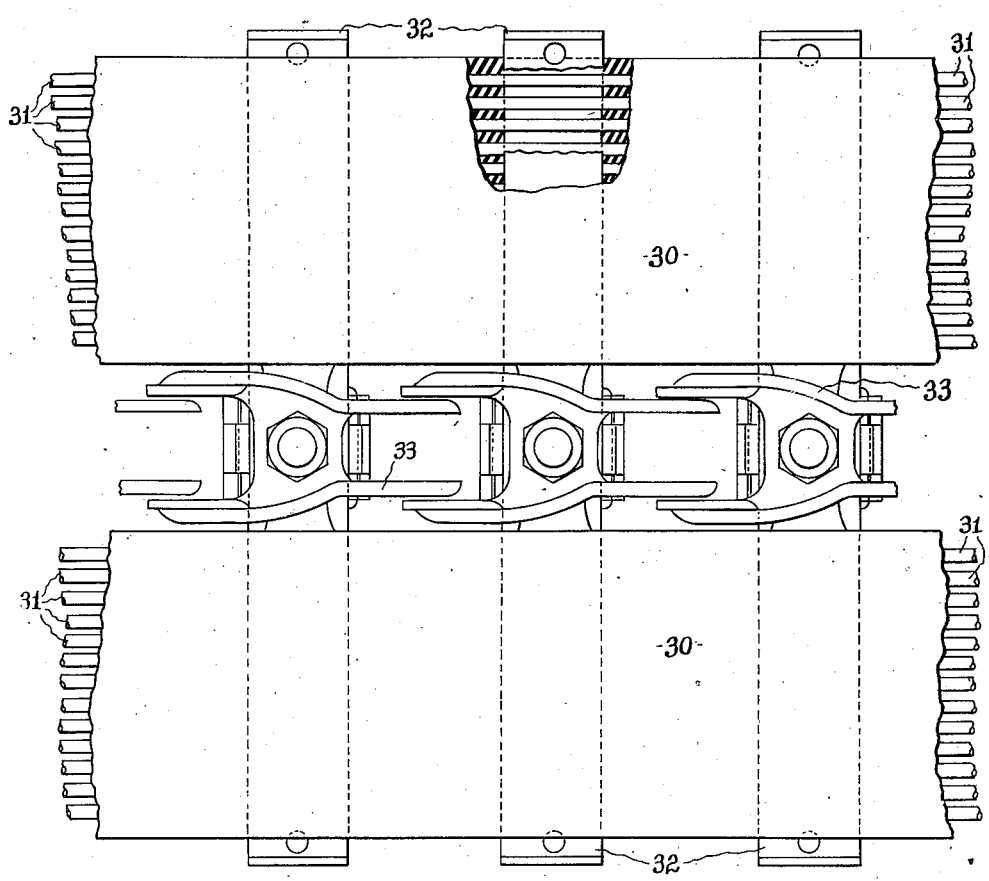
Fig. 2 is an enlarged fragmental bottom plan view of a portion of Fig. 1, taken from the position of the line 2—2 of Fig. 1.

Referring to Figs. 1 and 2, the flexible endless track comprises a pair of spaced vulcanized rubber tread bands 30 preferably but not necessarily continuous, which are reinforced by laterally spaced parallel strands of wire cable 31 which extend longitudinally of the track. This provides a smooth running tread which increases traction, reduces noise and vibration, and by the enclosure of the cables prevents corrosion thereof. All of the strands of the cable are attached at spaced intervals to metal crossbars 32 having suitable means provided for receiving and spacing the cables 31. This invention relates to improvements in the structure of these crossbars 32.

In one form of the device shown there is included a series of guides 33 secured to the crossbars 32 in the space between the flexible tracks 30 for the purpose of keeping the track in longitudinal alinement and to provide means for engagement with a driving sprocket. A similar construction is shown at 15 in the above mentioned Mayne patent and certain portions of the present structure are designed to coact with similar track guide members.

The crossbar structure shown in Figs. 3 to 22 inclusive, comprises an upper sub-assembly 32a and a lower sub-assembly 32b. The upper sub-assembly as best seen in Figs. 4 and 21 comprises an upper plate member 34, an intermediate reinforcing plate member 35 and a lower spacing plate member 36 to the central portion of which is attached the drive member 37. The upper plate member as best seen in Figs. 4, 8 and 21 comprises the plate 34 substantially the full width of the crossbar and long enough to extend from side to side of the double track and extending outside of the rubber covering at each side of the track as best seen in Fig. 4. The outer ends of the plate are turned up as at 34a providing strengthening end flanges and which aid in the attachment of grousers which are used to obtain additional traction in deep mud, etc. The ends of the plate are pierced and threaded as at 34b to receive securing bolts later described. The end flanges 34a may have strengthening deformations as shown at 34a'. The central portion of the plate is narrowed with portions of the side edges of the plate flanged upwardly as at 34c to provide positioning members for holding the guide plates 33 in proper relationship to the track. It will also be noted from Fig. 21 that the plate is offset upwardly at 34d to nest with the central portion of plate 35 below it. The plate has a central perforation at 34e to receive an attaching bolt later described.

The spacing plate 36 is also substantially the full width of the crossbar and is approximately the length of the plate 34 measured inside the end flanges 34a. This plate is first slotted at 36a leaving tie portions 36b between the slots extending parallel to the cables 31. These tie portions are bent downwardly as shown in Fig. 21 to provide spacing projections adapted to lie between the cables 31. These projections have rounded ends and coined edges so as not to chafe the cables. At its end portions each plate 36 is offset downwardly as at 36c by approximately the thickness of plate 35 for a purpose which will later appear. At the extreme ends the plates 36 are flanged downwardly as at 36d for strengthening purposes and to provide proper nesting action with the lower sub-assembly. The central portion of each plate 36 is provided with upturned side flanges 36e for strengthening purposes and to nest with similar flanges on other plates forming the upper sub-assembly. The plate is bent downwardly slightly at its central portion as indicated at 36f to provide room to assemble the other parts at the central portion of the crossbar. The plate is pierced as at 36g to receive a bolt as will hereinafter appear.

The intermediate plate 35 as best seen in Figs. 3, 4, 6 and 7 is narrow in that portion which extends along the tie portions 36b and is of about the same thickness as the offset of these tie portions so that the plate 35 nests between the plates 34 and 36 as best seen in Figs. 6 and 7. The end portions 35a of these plates are of substantially the full width of the crossbar and lie between the plate 34 and the portions 36c of the plates 36. The central portion of the plate 35 is of substantially the full width of the crossbar and has side flanges upturned as at 35b to nest with similar flanges of the other plates. The central portion of the plate is also offset upwardly as at 35c to nest with the similar portion 34d of the plate above it. The plate is pierced as at 35e to receive the central bolt.

The drive plate 37 best seen in Figs. 5, 11, 15 and 21 comprises a narrow plate of generally U-section having upturned flanges 37a, the central portions of which have tongues 37b which provide shoulders for engagement with the driving sprocket.

The parts 34, 35, 36 and 37 are all formed as above described and are provided with suitably placed welding projections 38. The parts are then clamped together in superimposed position under pressure and electric current is applied which flows mainly through the projections 38 thus fusing them and welding the parts into their final assembled position as shown in Figs. 3 to 7 inclusive.

The lower sub-assembly 32b as best seen in Figs. 4, 12, 13, 14 and 22 comprises a lower plate 39 which is the full width of the plates 34 and 36 and extends for the full length of the crossbar. The extreme outer ends of this plate 39 are flanged upwardly as at 39a and these flanges as best seen in Fig. 4 nest with the flanges 36d and form a strong closed end for the lower half of the crossbar. The plate is provided with holes 39b near the ends to receive the bolts which secure the upper and lower sub-assemblies together. At its center the plate is provided with an opening 39c in which is the bolt 40 provided with a countersunk head and preferably welded to the plate 39 as indicated at 41, Fig. 16. The plate 39 is offset upward slightly for a short distance at the center as indicated at 42 so that the head of bolt 40 does not extend below the lower edge of the cross-bar. The marginal edges of the plate at 39d in the center are flanged downwardly, thus strengthening the plate at this point.

The cable spacing plate member 43 is formed in two parts, each of these plates being the full width of the crossbar and being formed in the manner described in connection with the plate 36, i. e., the slotted portions 43a are cut away and the tie portions 43b are bent out of the general plane of the plate to form projections adapted to lie between the cables 31. At their outer ends these plates are notched as at 43c to accommodate the bolts 44 which secure the upper and lower sub-assemblies together. It will be noted that at the inner and outer ends of each plate 43 there are raised portions 43d of the same height as the bent parts of the tie portions 43b and these engage suitable coacting parts on the plate 36 to properly space the plates 36 and 43 when they are in their final assembled position.

Between the plates 39 and 43 are narrow plates 45 which extend across the bent parts of the tie portions 43b and lie in substantially the same plane as the marginal edges of the plate 43.

In the same manner as previously described in connection with the upper sub-assembly, the parts of the lower sub-assembly are provided with welding projections 38 and the plates 39, 43 and 45 are welded together by electric current under pressure so as to form a single unit for the lower sub-assembly.

The upper and lower sub-assemblies are then secured together by the countersunk bolts 44, the threaded ends of which extend into the threaded holes 34b in the plate 34. The sub-assemblies are secured together with the tie portions 36b and 43b in registration properly spacing the cables 31. The complete cross bar is then molded into the rubber track as shown in Figs. 1 and 2 and indicated in dot-dash lines in Fig. 4.

In Figs. 23 to 26 is shown a modification of the invention for use with a different type of track. In this case the track is guided by a pointed projection 46 in the center of a one-piece track and the drive is by means of two sprockets which engage against the outer ends of each crossbar.

In this modification the upper sub-assembly comprises a plate 47 extending across the entire length of the crossbar and having tie portions 47b between slotted openings 47a as previously described in connection with plates 36 and 43. The ends of plates 47 are offset slightly as at 47c to accommodate the intermediate plate. This intermediate plate 48 is narrow through a major portion of its length so as to extend along the bent parts of the tie portions 47b and the place has wide end portions 48a exactly like the parts 35a previously described. The top plate 49 extends across the full width of the crossbar and has its central portion bent upwardly to provide the guiding point 46. Plates 50 are welded on the open sides of the pointed portion 46 to prevent rubber getting in the hollow point when the track is molded in rubber. The plates 47, 48 and 49 are secured together by welding in the manner previously described.

The lower sub-assembly is composed of a cable spacing plate 51 which is an exact counterpart of the plate 47. A reinforcing plate 52 is the exact counterpart of plate 47. These plates are welded together.

The upper and lower sub-assemblies of this modified form of track are fastened together by the fillister head screws 53 with the cables 31 in proper position. The entire crossbar assembly is then molded in the rubber track.

What we claim is:

1. In a flexible endless track including spaced parallel cables extending lengthwise of the track and embedded in the material thereof, a crossbar extending transversely of the track and comprising two generally parallel crossbar portions lying on opposite sides of said cables, at least one of said portions comprising generally parallel plate members welded together in mutually reinforcing relationship, there being projections on one of said plate members struck up from the material of the plate member and adapted to lie between and to hold said cables properly spaced, and means securing said crossbar portions together.

2. In a flexible endless track including spaced parallel cables extending lengthwise of the track and embedded in the material thereof, a crossbar extending transversely of the track and comprising a plate member having parallel portions thereof cut away between the marginal edges of the plate member and having tie portions between said cut-away portions extending parallel to said cables, said tie portions being bent out of the general plane of said plate member and adapted to lie between said cables to hold them properly spaced.

3. In a flexible endless track including spaced parallel cables extending lengthwise of the track and embedded in the material thereof, a crossbar extending transversely of the track and comprising a plate member having parallel portions thereof cut away between the marginal edges of the plate member and having tie portions between said cut-away portions extending parallel to said cables, said tie portions being bent out of the general plane of said plate member and adapted to lie between said cables to hold them properly spaced, and a second plate member generally parallel to said first named plate member and welded thereto so that said plate members mutually reinforce each other.

4. In a flexible endless track including spaced parallel cables extending lengthwise of the track and embedded in the material thereof, a crossbar extending transversely of the track and comprising a plate member having parallel portions thereof cut away between the marginal edges of the plate member and having tie portions between said cut-away portions extending parallel to said cables, said tie portions being bent out of the general plane of said plate member and adapted to lie between said cables to hold them properly spaced, and a second plate member generally parallel to said first named plate member and having end flanges bent up and extending close to and over the end edges of said first named plate member and secured thereto by welding, whereby said second plate member covers the joints between said plate members at the ends thereof.

5. In a flexible endless track including spaced parallel cables extending lengthwise of the track and embedded in the material thereof, a crossbar extending transversely of the track and comprising a plate member having parallel portions thereof cut away between the marginal edges of the plate member and having tie portions between said cut-away portions extending parallel to said cables, said tie portions being bent out of the general plane of said plate member and adapted to lie between said cables to hold them properly spaced, and a second plate member extending along the bent parts of said tie portions, said second plate member being secured to said first named plate member by welding.

6. In a flexible endless track including spaced parallel cables extending lengthwise of the track and embedded in the material thereof, a crossbar extending transversely of the track and comprising a plate member having parallel portions thereof cut away between the marginal edges of the plate member and having tie portions between said cut-away portions extending parallel to said cables, said tie portions being bent out of the general plane of said plate member and adapted to lie between said cables to hold them properly spaced, a second plate member extending along the bent parts of said tie portions, a third plate member generally parallel to said first named plate member and extending over the marginal edges thereof, and all of said plate members being welded together.

7. In a flexible endless track including spaced parallel cables extending lengthwise of the track and embedded in the material thereof, a crossbar extending transversely of the track and comprising two generally parallel sub-assemblies, each of said sub-assemblies comprising a plate member having parallel portions thereof cut away between the marginal edges of the plate member and having tie portions between said cut-away portions extending parallel to said cables, said tie portions being bent out of the general plane of said plate member and lying between said cables to hold them spaced, each of said sub-assemblies having a second plate member generally parallel to said first named plate member and welded thereto, and said sub-assemblies being secured together with the bent parts of their tie portions in registration with each other and lying between said cables.

8. In a flexible endless track including spaced parallel cables extending lengthwise of the track and embedded in the material thereof, a crossbar extending transversely of the track and comprising a plate member having parallel portions thereof cut away between the marginal edges of the plate member and having tie portions between said cut-away portions extending parallel to said cables, said tie portions being bent out of the general plane of said plate member and adapted to lie between said cables to hold them properly spaced, a second plate member secured to and reinforcing said first named plate member, and one of said plate members having a portion bent out of its general plane and forming guide means for alining said track.

9. In a flexible endless track including spaced parallel cables extending lengthwise of the track and embedded in the material thereof, a crossbar extending transversely of the track with the ends of the crossbar extending beyond the track itself, said crossbar comprising two plates on opposite sides of said cables and clamped thereto, the end edges of said plates having flanges extending one toward the other, and the flanges of one plate nesting within the flanges of the other plate to effectively close the joint between said plates at their ends.

10. In a flexible endless track including spaced parallel cables extending lengthwise of the track and embedded in the material thereof, a crossbar extending transversely of the track and comprising a plate member having parallel portions thereof cut away between the marginal edges of the plate member and having tie portions between said cut-away portions extending parallel to said cables, said tie portions being bent out of the general plane of said plate member and adapted to lie between said cables to hold them properly spaced, and a second plate member adapted to lie between the marginal edges of the first named plate member against said tie portions and secured to said first named plate member to reinforce it.

EDWIN L. ALLEN.
HAROLD B. MUSTER.